Dec. 18, 1956 L. HOWSON 2,774,872

PHASE SHIFTING CIRCUIT

Filed Dec. 17, 1952

INVENTOR
L. HOWSON
BY H. A. Burgess
ATTORNEY

United States Patent Office 2,774,872
Patented Dec. 18, 1956

2,774,872
PHASE SHIFTING CIRCUIT

Louis Howson, Bloomfield, N. J., assignor to Bell Telephone Laboratories, Incorporated, New York, N. Y., a corporation of New York Application December 17, 1952, Serial No. 326,541
4 Claims. (Cl. 250—36)

The present invention relates to variable phase shifting circuits permitting any desired shift to be made between input and output waves of the same frequency.

An object of the invention is an all-electronic variable phase shifter capable of linear control and operable over a wide frequency range.

A further object is such a phase shifter that is relatively insensitive to amplitude changes in the applied waves.

In the form of the invention to be disclosed herein, an oscillator supplies the output waves in any desired phase relation with respect to the input or applied waves. The frequency of the output waves is held the same as the frequency of the applied waves, by use of a phase detector and an electrically variable reactance controlled thereby. Hereinafter, unless otherwise stated, it will be assumed that the two frequencies have been made equal under the condition of zero input to the electrically variable reactance. At zero phase setting the output waves are maintained in exact phase coincidence with the input waves, the detector output being zero. For other than zero phase setting the control of the phase of the output waves whereby they are held in definite phase relation with respect to the input wave is modified to establish a new phase relation determined by the new setting.

The phase setting is made by applying a variable bias voltage to the electrically variable reactance which controls the frequency and phase of the output oscillator. This control can be made extremely accurate and highly linear, one type of control being in the form of a potentiometer. The potentiometer can be calibrated in phase shift in degrees and fractions of degrees by way of example.

Reference will be made to the drawings for a more detailed disclosure of the invention.

Figures 1, 2:
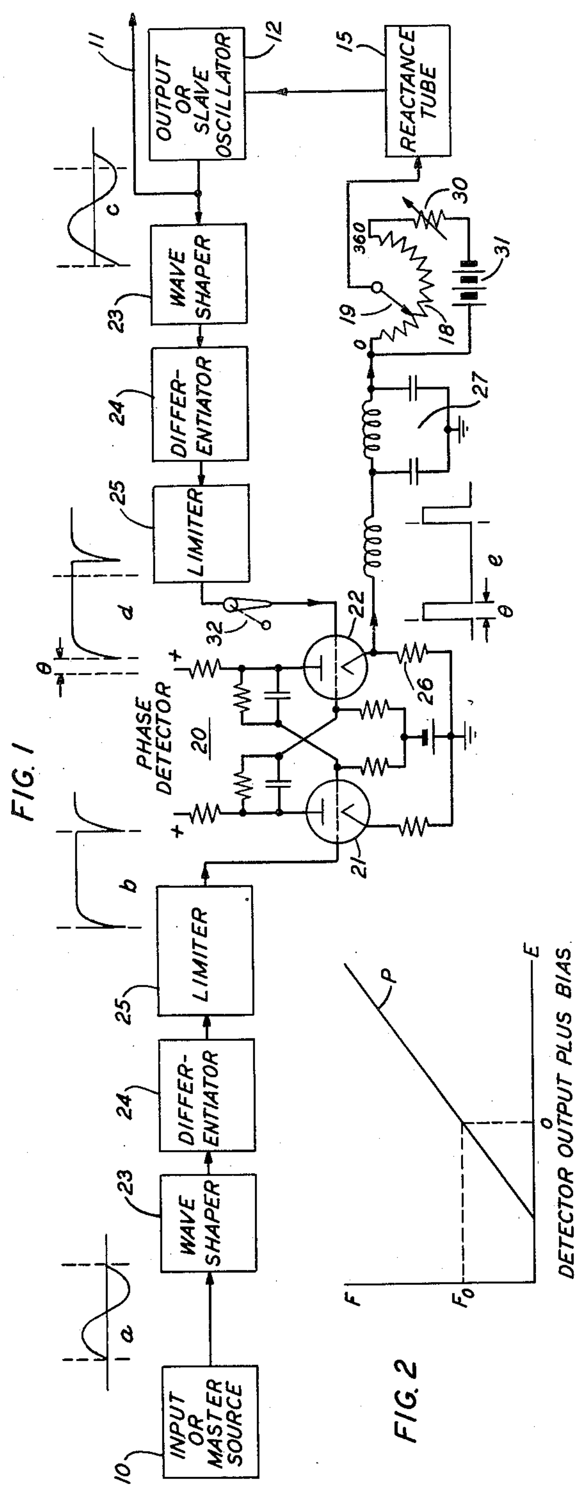
Fig. 1 is a schematic circuit diagram of a complete phase shifter according to the invention.
Fig. 2 is a graph to be referred to in the description.

The box 10 represents any input wave circuit to which incoming waves are applied or in which waves are generated, whose phase is to be shifted as may be desired. The waves of shifted phase appear at the output terminal 11. These output waves of shifted phase are generated in a controlled or slave oscillator 12, which is at all times under control of the input waves and faithfully follows all variations of frequency and phase of the input waves. The input 10, therefore, acts as a master source.

The phase detector compares the phase of sources 10 and 12 and develops a direct-current output voltage that is proportional to the difference in phase existing between the waves. A control circuit extends from the detector output to the reactance tube 15 which in response to an input voltage coming from the detector or phase shifting bias source shifts the phase of oscillator 12 until the input to the reactance tube is reduced to zero. In the absence of any inserted phase shifting bias the source 12 is brought into exact phase coincidence with source 10 when the input to the reactance tube is reduced to zero.

By means of the phase-shifting control comprising potentiometer resistance 18 and slider 19, a variable amount of direct-current bias voltage can be inserted in series between the output of the phase detector and the input of the reactance tube 15. The control exerted upon the output oscillator 12 is again such as to reduce the input to the reactance tube to zero, but in this case this can happen only when the detector output voltage is equal and opposite to the voltage introduced by the potentiometer. Under these conditions the output oscillator is caused to supply waves displaced in phase with respect to the input waves by an amount dependent upon the magnitude of the inserted bias.

The phase detector 20 as illustrated is of the multivibrator type comprising triodes 21 and 22. It is to be understood that the invention is not limited to this or any particular form of phase detector but this type has the advantage of possessing a linear characteristic over substantially the entire phase range of 0 to 360 degrees. The tubes 21 and 22 are pulse-operated and for this purpose wave transforming circuits are introduced. These comprise a wave shaper 23, differentiator 24 and limiter 25, there being a set of these following each of the wave sources 10 and 12. The purpose of these three devices is to derive from applied sine waves a spike of current once in each cycle by distorting the wave, suppressing portions of one polarity, and limiting the amplitude so as to produce spikes of fixed amplitude and of a single polarity. Devices to perform these functions are well known in the art. The wave shaper can be an overloaded amplifier giving a squared wave output. The differentiator can comprise inductive means for generating a pulse from each edge of the square wave and a rectifier for suppressing pulses of one polarity, and the limiter can comprise a biased amplifier. Wave diagrams *a*, *b*, *c* and *d* adjacent the devices indicate qualitatively the kind of transformations which the waves undergo.

To illustrate the principle of operation, it is assumed that the source 12 lags the source 10 by angle $\theta$, as indicated by the relative displacements of the wave diagrams *c* and *d* with respect to *a* and *b*. Triode 21 is normally in its "on" condition. It is cut off by the first arriving pulse *b* from limiter 25, thereby switching triode 22 "on" and starting current flow through cathode load resistor 26. Tube 22 is again cut off by pulse *d* from its input limiter 25. There is thus caused to flow through resistor 26 a pulse of current of a duration proportional to the phase difference between the applied waves, as indicated at *e*. These pulses are all of the same height due to the operation of tubes 21 and 22 as off-on switches. When these pulses are integrated in low pass filter 27 they are smoothed into a direct current having an amplitude proportional to the length of the pulses *e*, or in other words, proportional to the phase difference between the wave sources 10 and 12. If the arm 19 is on its zero setting this direct current constitutes the total input to the reactance tube 15, and the latter will so change the instantaneous frequency of oscillator 12 as to advance it in phase until it is in phase coincidence with oscillator 10. Triode 22 will not be turned on under these conditions since the negative pulse *d* coincides with negative pulse *b*, and each counteracts any effect of the other in producing output current. The input to the reactance tube is then zero and the control assumed to have been exerted on oscillator 12 to change its frequency is removed.

With this principle of operation in mind, the effect of purposely introducing bias by moving arm 19 off zero may readily be seen. The reactance tube 15 in response to such movement produces a transitory shift in the frequency of generator 12, causing the latter to start changing its phase with respect to source 10. This will continue until a phase position is reached at which the input to the reactance tube is reduced to zero, at which point the oscillator 12 becomes locked in its new phase position. The extent of the phase shift that has taken place is in proportion to the extent of movement of arm 19, assuming a uniformly varying resistance 18.

The frequency control characteristic of the system is indicated in Fig. 2. The curve P shows the relation between the frequency of slave oscillator 12 plotted vertically (F) and the algebraic sum of detector output voltage and bias voltage plotted horizontally (E). At $F_0$ the oscillator 12 is at the mean value of the frequency range over which it may be varied by reactance tube 15, this corresponding to a zero voltage input to the reactance tube. If the arm 19 is not at zero phase position but is moved toward zero the voltage E assumes a positive value and F increases above $F_0$ until equilibrium is restored when F again becomes equal to $F_0$. The frequency changes are of short duration and persist only long enough to increase or decrease the phase by the required amount.

The variable resistance 30 is provided for calibrating purposes. To calibrate the circuit, the key 32 is opened and arm 19 is moved to the 360-degree point on its resistance 18. The voltage across resistance 26 is now maximum since current flows through tube 22 without interruption, the condition that would obtain for full 360 degrees phase shift. Resistance 30 is adjusted until the input to reactance tube 15 is zero. In this condition it is known that the voltage obtained from arm 19 is exactly equal and opposite to the voltage existing across resistance 26. The circuit is now calibrated at the 360 degree point, and since the characteristic of a phase detector of the type shown at 20 is known to be linear, calibration at this one point is sufficient. It is of advantage to be able to calibrate the circuit without having to resort to external phase standards.

In the use of the circuit as shown in Fig. 1, the operator initially adjusts the source 12 to the same frequency as source 10 with the reactance tube input at zero. This can be done by manual adjustment of a variable capacitor or inductor in the tuning circuit of source 12. If it is later desired to carry out measurements at some different frequency, a new adjustment of source 12 to agree with the new frequency of input 10 is made.

Figure 3:
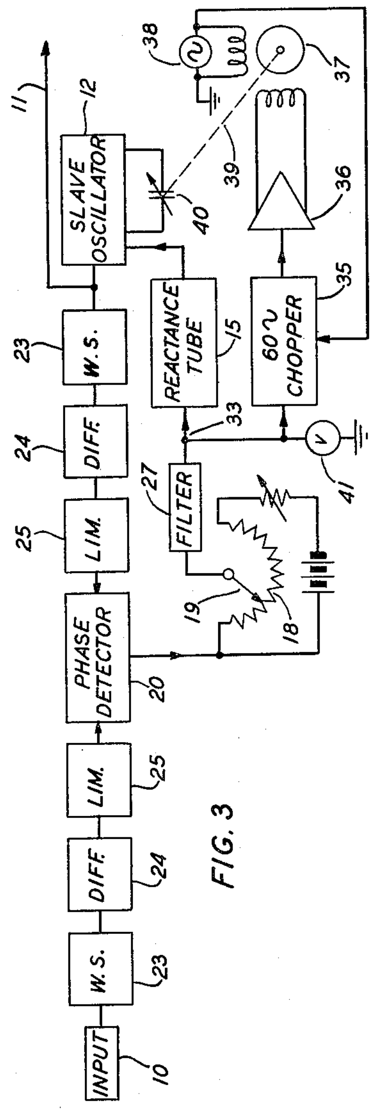
Fig. 3 is a schematic circuit diagram showing the application of a servo-motor loop to a system like that shown in Fig. 1.

In Fig. 3 there is shown a servomotor loop for continuously adjusting the frequency of source 12 so that the manual adjustment referred to in connection with Fig. 1 can be dispensed with. In the figure, some of the filtered output from the phase detector is taken off at 33 and applied to amplifier 36 via chopper 35. The latter is an interrupter converting the direct-current voltage output of the phase detector to a 60-cycle voltage which after amplification at 36 energizes one of the quadrature field windings of two-phase servomotor 37 the other field winding being supplied from constant 60-cycle supply 38. The rotor of the servomotor 37 is connected by suitable mechanical coupling 39 (which may include any necessary reduction gearing) to the rotor of variable capacitor 40 in the tuning circuit of slave oscillator 12. This frequency control loop is supplemental to the frequency control of Fig. 1 including reactance tube 15. Both controls operate in concert and without mutual interference. A voltmeter 41 is convenient as a check on the proper operation of the circuit.

If the frequency of the input waves changes, the output voltage of the phase detector changes and both frequency controls of oscillator 12 respond. It is impossible to reduce the voltage at point 33 to zero until both sources 10 and 12 agree in frequency and the desired phase exists between them, so that the two controls continue to operate to change the frequency of slave oscillator 12 until zero voltage at point 33 is reached.

If the frequency of source 10 increases, the voltage change at 33 as shown by voltmeter 41 will have one sign, say positive. This moves the E-value in Fig. 2 to the right and produces an increase in F, the frequency of the slave oscillator. Both frequency controls cooperate to increase F, the servo control having the greater range and continuing to increase F as long as E in Fig. 2 is positive.

If the voltmeter has a reading other than zero, this indicates that the circuit has not reached a steady-state condition but is in process of becoming stabilized at a new frequency or phase. The voltmeter is therefore a useful guide to the operator in practice.

An advantage of this system is that the output amplitude remains constant throughout the 0 to 360 degree phase shift range. This is something that has been found hard to achieve in other types of phase shifters, since they usually depend on a zero value or an infinity value, i. e. infinite Q and/or zero conductance in network types of phase shifters.

The invention is not to be construed as limited to the circuit or apparatus details disclosed.

What is claimed is:

1. A system for maintaining two wave sources of substantially the same frequency in a selected constant phase relationship over a wide range comprising means for translating the phase difference between said two wave sources into a direct-current control voltage proportional to said phase difference, means for selecting the desired phase relationship comprising a variable direct-current bias source calibrated in phase angle, means for deriving a difference voltage equal to the difference between the voltage of said bias source and said control voltage, and means for bringing said wave sources into the desired phase relationship comprising voltage-actuated reactance means for one of said wave sources and means for applying said difference voltage to said reactance means for shifting the phase of said one wave source.

2. In combination, an input source of waves, an output source of waves, said input and output sources being at substantially the same frequency, wave-shaping means for deriving a sharp spike from each of said input and output waves coincident with the start of each cycle of said waves, a bistable multivibrator circuit having two input points and producing output pulses proportional in duration to the phase difference between waves applied to said two input points, means for applying the outputs of said wave-shaping means to the two input points of said multivibrator, integrating means for deriving from the output pulses of said multivibrator a unidirectional control voltage, a control loop coupling said control voltage to said output wave source for bringing said output source into a selected phase relationship with said input source comprising a variable direct-current bias source calibrated in phase angle and poled in opposition to said control voltage, and voltage-actuated electronic reactance means responsive to the difference between said control voltage and said bias for transitorily varying the frequency of said output source until said desired phase relationship is obtained.

3. A system for maintaining two wave sources in a selected constant phase relationship, one of said wave sources including a resonant frequency-determining circuit, said system comprising relatively slow-acting means for equalizing the frequencies of the said wave sources comprising a servo-operated variable reactance coupled to said frequency-determining circuit, a relatively fast acting phase-sensitive control loop operatively connected to control selectively the phase angle between said sources, said control loop including a phase detector producing a direct voltage output proportional to said phase angle, means for applying the outputs of said wave sources to said phase detector, a voltage-responsive electronic reactance device coupled to said one of said wave sources operable to control the phase thereof, an adjustable direct-current biasing means calibrated in phase angle connected between said phase detector and said reactance device for selecting the desired phase relationship, and means for impressing the difference between said phase detector output and said bias as a control voltage on said reactance device.

4. A system according to claim 1 including also a variable calibrating resistance in circuit with said variable direct-current bias source for enabling the voltage of said source to be equated to the detector output voltage at a given value of phase angle difference between the waves from said sources.

References Cited in the file of this patent

UNITED STATES PATENTS

| | | |
|---|---|---|
| 2,406,309 | Ziegler | Aug. 20, 1946 |
| 2,526,353 | Harralson | Oct. 17,, 1950 |
| 2,527,523 | Borst | Oct. 31, 1950 |
| 2,568,412 | Robinson | Sept. 18, 1951 |
| 2,605,425 | Hugenholtz | July 29, 1952 |
| 2,610,297 | Leed | Sept. 9, 1952 |